Figure 1:
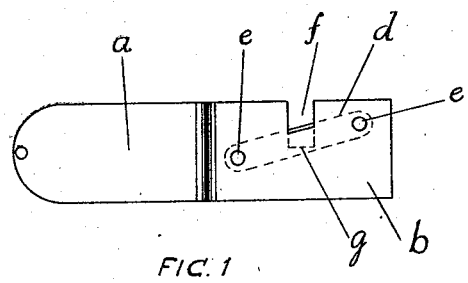

Sept. 9, 1924.　　　　　　　　　　　　　　　　1,508,314
A. WILLIAMS ET AL
SHARPENER FOR SCISSORS AND TOOLS HAVING SIMILAR CUTTING EDGES
Filed May 7, 1923

Inventors
Alfred Williams,
Henry Graville Bennett,
Ivo Rowe,
By Toulmin & Toulmin,
Attorneys.

Patented Sept. 9, 1924.

1,508,314

UNITED STATES PATENT OFFICE.

ALFRED WILLIAMS, HENRY GRAVILLE BENNETT, AND IVO ROWE, OF SHEFFIELD, ENGLAND.

SHARPENER FOR SCISSORS AND TOOLS HAVING SIMILAR CUTTING EDGES.

Application filed May 7, 1923. Serial No. 637,082.

*To all whom it may concern:*

Be it known that we, ALFRED WILLIAMS, HENRY GRAVILLE BENNETT, and IVO ROWE, all of 41 Eyre Lane, Sheffield, in the county of York, England, and all subjects of the King of Great Britain and Ireland, have invented certain new and useful Improvements in Sharpeners for Scissors and Tools Having Similar Cutting Edges, of which the following is a specification.

This invention relates to sharpeners for scissors and tools having similar cutting edges.

In scissors and some other tools having similar cutting edges, difficulty is experienced in sharpening said edges without taking the scissors or tools to pieces and re-grinding the blades, the reason being that the cutting edges are bevelled, and for this reason, hitherto, it has not been possible to sharpen them with devices similar to those for sharpening knives.

The object of this invention is to construct a tool for sharpening scissors and other tools having cutting edges.

A sharpener for scissors and tools having similar cutting edges made in accordance with this invention comprises a holder, a sharpening strip-device angularly positioned in said holder, and grooves in the sides of said holder transversely to said device.

Referring to the drawings filed herewith:—

Figure 2:
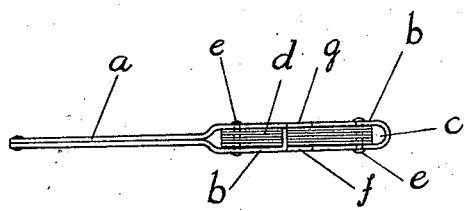

Fig. 1 is an elevation of one form of scissors sharpener made in accordance with this invention, and Fig. 2 is a plan of same.

A holder *a* is provided with two cheeks *b, b* forming a recess *c* in which are disposed a plurality of hardened steel strips or blades *d* at an angle as shown and secured by rivets or pins *e* or the like passing through the cheeks. In the top of the cheeks *b, b* above the members *d* are formed two grooves *f, g* exposing the blades, the groove *f* extending to the level of the top of the blades *d* and the groove *g* extending to below the level of the blades. The grooves may be formed by punching or any other suitable means and the piece of material from the groove *f* is preferably bent inwards at a right angle to the cheeks and so forms a guide inclined at an angle of 75° or thereabouts to the blades *d* for the scissor blade when being drawn across said blades, thereby ensuring the scissor blade being always drawn across at the proper angle to the blades to retain the requisite bevel necessary.

What we claim and desire to secure by Letters Patent is:—

1. A sharpener for scissors and tools having similar cutting edges comprising a holder formed of a plate bent on itself to form a loop at one end and a handle at the other end, pins mounted in the holder transversely of the loop, a plurality of blades mounted on the pins angularly in the loop, and grooves in the sides of the holder transversely to and exposing the blades.

2. A sharpener for scissors and tools having similar cutting edges comprising a holder formed of a plate bent on itself to form a loop at one end and a handle at the other end, pins mounted in the holder transversely of the loop, a plurality of blades mounted on the pins angularly in the loop, and grooves in the sides of the holder transversely to and exposing the blades, and a guide asociated with the grooves inclined to the blades.

3. A sharpener for scissors and tools having similar cutting edges comprising a holder formed of a plate bent on itself to form a loop at one end and a handle at the other end, pins mounted in the holder transversely of the loop, a plurality of blades mounted on the pins angularly in the loop, and grooves in the sides of the holder transversely to and exposing the blades, said grooves being of different depths relatively to the blades.

4. A sharpener for scissors and tools having similar cutting edges comprising a holder formed of a plate bent on itself to form a loop at one end and a handle at the other end, pins mounted in the holder transversely of the loop, a plurality of blades mounted on the pins angularly in the loop, and grooves in the sides of the holder transversely to and exposing the blades, said grooves being of different depths relatively to the blades, and a guide associated with the grooves inclined to the blades.

In testimony whereof, we affix our signatures.

ALFRED WILLIAMS.
HENRY GRAVILLE BENNETT.
IVO ROWE.